US009048767B2

(12) United States Patent
Rozman et al.

(10) Patent No.: US 9,048,767 B2
(45) Date of Patent: Jun. 2, 2015

(54) MOTOR DRIVE FOR PERMANENT MAGNET SYNCHRONOUS MOTOR

(75) Inventors: Gregory I. Rozman, Rockford, IL (US); Thomas A. Duclos, Suffield, CT (US); Duane A. James, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 597 days.

(21) Appl. No.: 13/356,348

(22) Filed: Jan. 23, 2012

(65) Prior Publication Data

US 2013/0187579 A1 Jul. 25, 2013

(51) Int. Cl.
- H02P 21/00 (2006.01)
- H02P 6/10 (2006.01)
- H02P 27/00 (2006.01)
- H02P 21/14 (2006.01)

(52) U.S. Cl.
CPC ...... *H02P 6/10* (2013.01); *H02P 21/14* (2013.01); *H02P 21/0035* (2013.01)

(58) Field of Classification Search
CPC ... H02P 21/0035; H02P 21/06; H02P 21/146; H02P 2207/05
USPC .......... 318/400.02, 400.23, 722, 811
See application file for complete search history.

(56) References Cited

U.S. PATENT DOCUMENTS

| 7,746,024 B2 * | 6/2010 | Rozman et al. | 318/722 |
| 2005/0207190 A1 * | 9/2005 | Gritter | 363/40 |
| 2007/0109823 A1 * | 5/2007 | Rastogi et al. | 363/40 |
| 2011/0266987 A1 * | 11/2011 | Markunas et al. | 318/400.24 |
| 2011/0298405 A1 * | 12/2011 | Costanzo et al. | 318/400.23 |

OTHER PUBLICATIONS

Munoz, et al., "On-Line Dead-Time Compensation Technique for Open-Loop PWM-VSI Drives." IEEE Transactions on Power Electronics, vol. 14, No. 4, Jul. 1999. pp. 683-689.
Liu, et al., "Novel dead time compensation method for induction motor drives using space vector modulation." IEEE Proc. Electr. Power Appl. vol. 145, No. 4, Jul. 1998. pp. 387-392.
Urasaki, et al., "Adaptive Dead-Time Compensation Strategy for Permanent Magnet Synchronous Motor Drive." IEEE Transactions on Energy Conversion, vol. 22, No. 2. Jun. 2007. pp. 271-280.

* cited by examiner

*Primary Examiner* — Eduardo Colon Santana
*Assistant Examiner* — Gabriel Agared
(74) *Attorney, Agent, or Firm* — Kinney & Lange, P.A.

(57) ABSTRACT

A pulse-width modulation (PWM) inverter controller compensates for harmonics in the output current provided by a PWM inverter to permanent magnet (PM) motor. The PWM inverter controller includes a field-oriented controller (FOC) that monitors output currents provided by the PWM inverter to the PM motor and employs the monitored output currents in a current loop feedback that generates control signals. A harmonic compensator transforms monitored phase currents into rectangular waveforms having magnitudes modified based on detected harmonics within the monitored phase currents to generate compensation signals. The compensation signals generated by the harmonic compensator are summed with the control signals generated by the FOC to generate compensated control signals. A PWM signal generator generates PWM signals for controlling the PWM inverter based on the compensated control signals.

16 Claims, 4 Drawing Sheets

US 9,048,767 B2

MOTOR DRIVE FOR PERMANENT MAGNET SYNCHRONOUS MOTOR

STATEMENT OF GOVERNMENT INTEREST

This invention was made with government support under N65540-08-D-0017 DO 0001 awarded by the United States Navy. The government has certain rights in the invention.

BACKGROUND

The present invention is related to motor drives, and in particular to motor drives employed with respect to permanent magnet synchronous motors.

Motor drives control the operation of a motor by controlling the supply of power to the motor. In particular, motor drives oftentimes include a pulse-width modulation (PWM) inverter comprised of a plurality of solid-state switching devices that are selectively turned On and Off to generate the desired alternating current (AC) waveform for supply to the motor.

A drawback of motor drives employing a PWM inverter is the creation of current harmonics on the output of the motor drive that can result in negative torque components being provided to the motor, thereby decreasing performance of the motor. The creation of current harmonics on the output of the motor drive is attributable to the dead-time of gate drives within the PWM inverter, such dead-time being added to prevent the short circuit of inverter legs, to turn On/Off times of the solid-state switching devices employed by the PWM inverter, and/or to On-voltages associated with the solid-state switching devices and diodes.

To minimize the presence of these harmonics, prior art controllers have relied on increasing the bandwidth of the current loop used to regulate the output current of the inverter. However, this solution makes the system vulnerable to noise and instability, which may amplify system resonances.

SUMMARY

A pulse-width modulation (PWM) inverter controller compensates for harmonics in the output current provided by a PWM inverter to a permanent magnet (PM) motor. The PWM inverter controller includes a field-oriented controller (FOC) that monitors output currents provided by the PWM inverter to the PM motor and employs the monitored output currents in a current loop feedback that generates control signals. A harmonic compensator transforms monitored phase currents into rectangular waveforms having magnitudes modified based on detected harmonics within the monitored phase currents to generate compensation signals. The compensation signals generated by the harmonic compensator are summed with the control signals generated by the FOC to generate compensated control signals. A PWM signal generator generates PWM signals for controlling the PWM inverter based on the compensated control signals.

DETAILED DESCRIPTION

Figure 1:
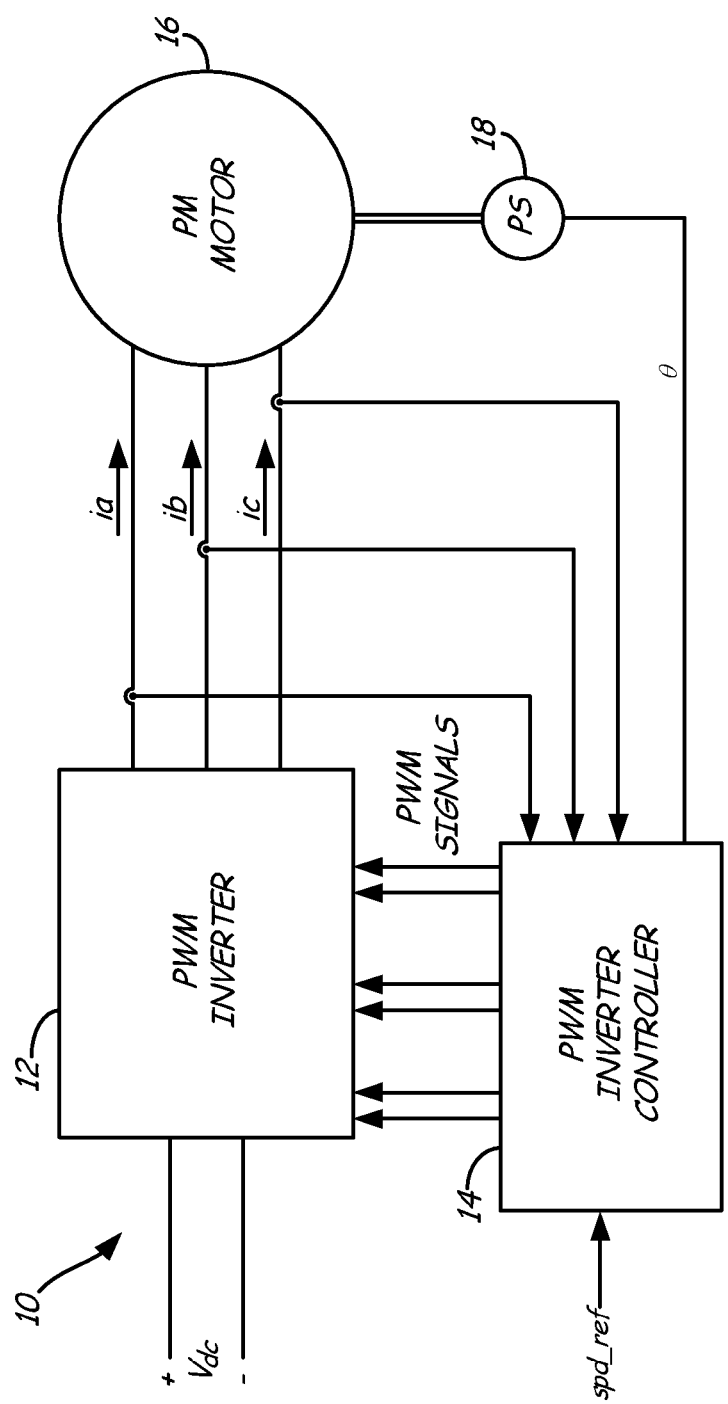
FIG. 1 is a block diagram of a motor drive system according to an embodiment of the present invention.

FIG. 1 is a block diagram of motor drive system 10 according to an embodiment of the present invention. Motor drive system 10 includes pulse-width modulation (PWM) inverter 12, PWM inverter controller 14, permanent magnet (PM) motor 16, and position sensor (PS) 18. In the embodiment shown in FIG. 1, PWM inverter 12 includes a plurality of solid-state switching devices (not shown) that are selectively turned On and Off to convert a direct current (DC) input to a three-phase alternating current (AC) output for provision to PM motor 16. The PWM inverter controller 14 monitors the AC current (labeled 'ia', 'ib', and 'ic') provided to PM motor 16 and PM motor position information θ provided by position sensor 18. Based on the monitored currents ia, ib, and ic and monitored position information θ, PWM inverter controller 14 generates PWM signals that selectively control the state of solid-state switches employed by PWM inverter 12.

Figure 2:
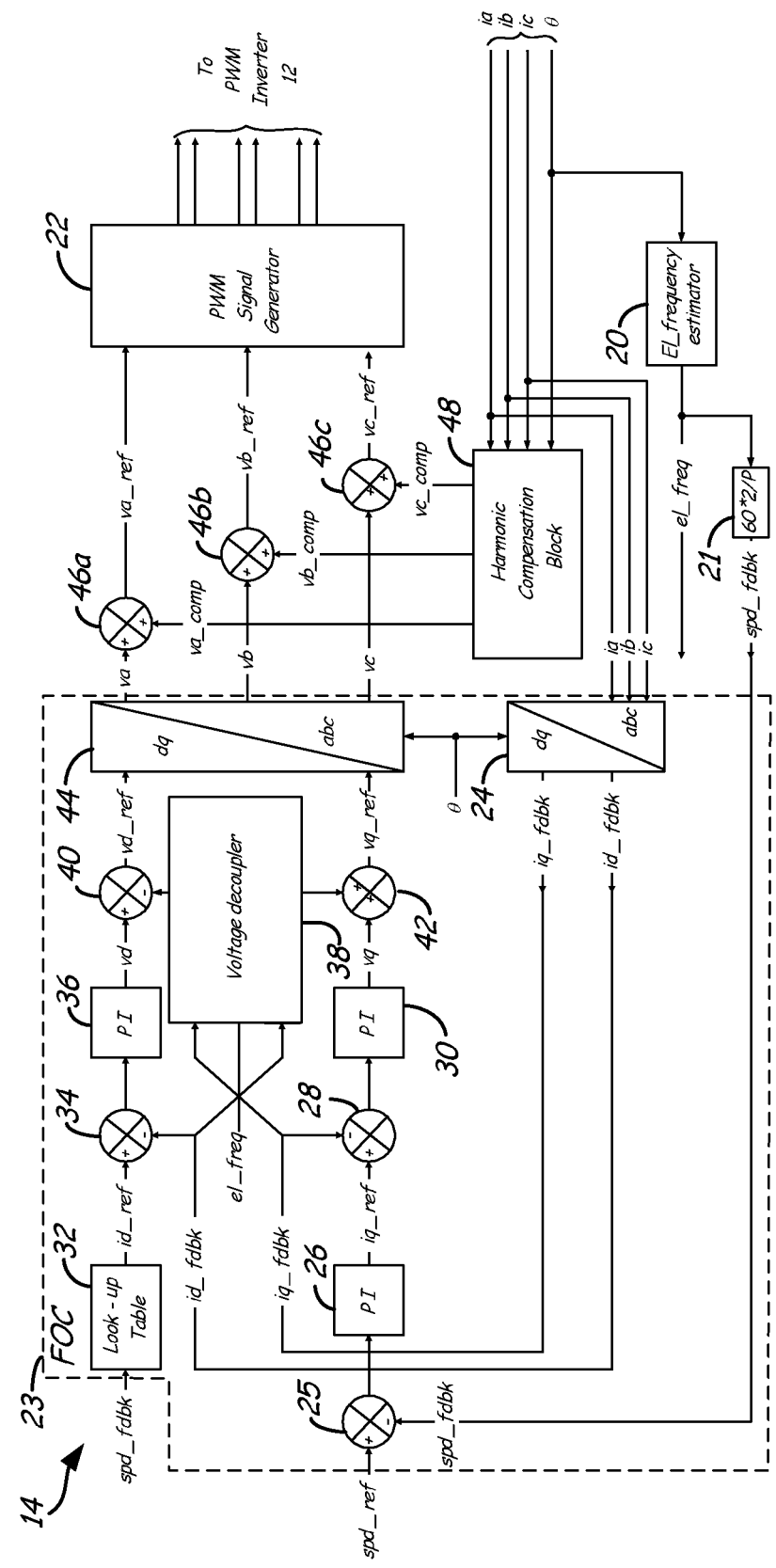
FIG. 2 is a block diagram illustrating functions performed by a pulse-width modulation (PWM) inverter controller according to an embodiment of the present invention.

FIG. 2 is a block diagram illustrating functions performed by pulse-width modulation (PWM) inverter controller 14 according to an embodiment of the present invention. In general, PWM inverter controller 14 acts to control the current supplied to PM motor 16 such that PM motor 16 is driven at a desired speed (as indicated by speed reference spd_ref). In addition, PWM inverter controller 14 detects harmonics in the monitored output currents ia, ib, and ic and generates compensation signals designed to decrease the magnitude of the detected harmonics. In this way, the present invention provides auto-tuning of the compensation signal to reduce output current harmonics.

The speed of PM motor 16 is estimated based on position feedback θ received from position sensor 18. Position feedback signal θ is provided to electrical frequency estimator 20, which calculates in response to the position feedback signal θ an estimate of the electrical frequency el_freq. The electrical frequency estimate el_freq is converted by block 21 to a speed feedback estimate spd_fdbk that represents the estimated speed of PM motor 16. The speed feedback estimate spd_fdbk is compared to a desired or reference speed value spd_ref at block 25 to generate an error signal that represents whether the speed of PM motor 16 should be increased or decreased (i.e., whether torque supplied to PM motor 16 should be increased or decreased). Likewise, the speed feedback estimate spd_fdbk is used to calculate the field weakening required at a given speed of PM motor 16, as discussed in more detail with respect to the particular control functions performed by PWM inverter controller 14.

In the embodiment shown in FIG. 2, field oriented controller (FOC) 23 monitors the output currents ia, ib, and ic, converts the monitored output currents from the three-phase stationary reference frame (i.e., abc reference frame) to a dq rotating reference frame and provides the transformed current feedback components iq_fdbk, and id_fdbk to a current loop that generates control signals to minimize the difference or error between the monitored current feedback components iq_fdbk, and id_fdbk and the desired current components iq_ref, and id_ref.

In the embodiment shown in FIG. 2, FOC 23 includes abc/dq transformer 24, which transforms monitored currents ia, ib, and ic from the three-phase stationary reference frame to a dq rotating reference frame comprised of a quadrature current feedback signal iq_fdbk and a direct current feedback signal id_fdbk.

The current feedback signals iq_fdbk, and id_fdbk are provided in feedback to respective control loops that compare the current feedback signals iq_fdbk, and id_fdbk to reference signals id_ref, and iq_ref, respectively. In particular, the quadrature current feedback signal iq_fdbk is compared to quadrature reference current iq_ref. In the embodiment shown in FIG. 2, the quadrature current reference value iq_ref (i.e., the desired torque to be supplied to PM motor 16) is based on a comparison at block 25 of the monitored current speed spd_fdbk of PM motor 16 with the desired or reference speed spd_ref of PM motor 16. The resulting difference or error between the reference speed spd_ref and current speed spd_fdbk is provided to proportional-integral (PI) controller 26 to generate quadrature current reference signal iq_ref. The quadrature current reference signal iq_ref is compared to the quadrature current feedback signal iq_fdbk at block 28 to generate an error or difference between the reference signal and the feedback signal. The error or difference is provided to PI controller 30 to generate quadrature voltage signal vq that represents the quadrature voltage required to minimize the difference between the quadrature current feedback iq_fdbk and the quadrature current reference iq_ref.

When operating at speed below at which a voltage limit has been reached (base speed of the PM motor) id_ref is set to zero. To operate above base speed, the direct component of stator current needs to be negative to weaken the magnetic field of the permanent magnets. This operation is referring as field weakening. In the embodiment shown in FIG. 2, the speed feedback signal spd_fdbk is provided to look-up table 32, which provides in response a desired or reference direct current component id_ref to enable field weakening. At block 34, the direct current reference id_ref is compared to the direct current feedback component id_fdbk to generate an error or difference signal. The error signal is supplied to PI controller 36 to generate direct voltage signal vd that represents the direct voltage required to minimize the difference between the direct current feedback id_fdbk and the direct current reference id_ref.

Voltage decoupling block 38 decouples the quadrature voltage component from the direct voltage component. In one embodiment, voltage decoupling block 38 combines the quadrature current feedback signal iq_fdbk with the electrical frequency of PM motor 16, and subtracts this value at block 40 from the calculated direct voltage reference component vd to generate reference direct voltage component vd_ref. Similarly, voltage decoupling block 38 combines the direct current feedback signal id_fdbk with the electrical frequency of PM motor 16, and adds this value at block 42 from the calculated quadrature voltage reference component vq to generate reference quadrature voltage component vq_ref.

The resulting reference quadrature voltage component vq_ref and reference direct voltage component vd_ref are provided to dq/abc transform block 44 for conversion from the dq rotating reference frame to the three-phase stationary reference frame. The resulting reference control signals va, vb, vc represent the outputs required to correct errors between the desired quadrature current and direct current references values id_ref, and id_ref and the quadrature current feedback and direct current feedback signals iq_fdbk, and id_fdbk. However, control signals va, vb, and vc do not account for characteristics of PWM inverter 12 (e.g., dead-time of solid-state switching devices, turn On/Off timing of the devices, On-voltage, etc.) that contribute to phase output current harmonics.

In the embodiment shown in FIG. 2, harmonic compensation block 48 generates harmonic compensation signals va_comp, vb_comp, and vc_comp based on the monitored phase currents ia, ib, and ic. The harmonic compensation signals va_comp, vb_comp, and vc_comp are added to control signals va, vb, and vc by blocks 46a, 46b, and 46c, respectively, to generate compensated control signals va_ref, vb_ref, and vc_ref provided in turn to PWM signal generator 22. In this way, harmonic compensation is provided based on the actual harmonics detected, and is not based on inverter characteristics that may change over time or between individual inverters.

Figure 3A:
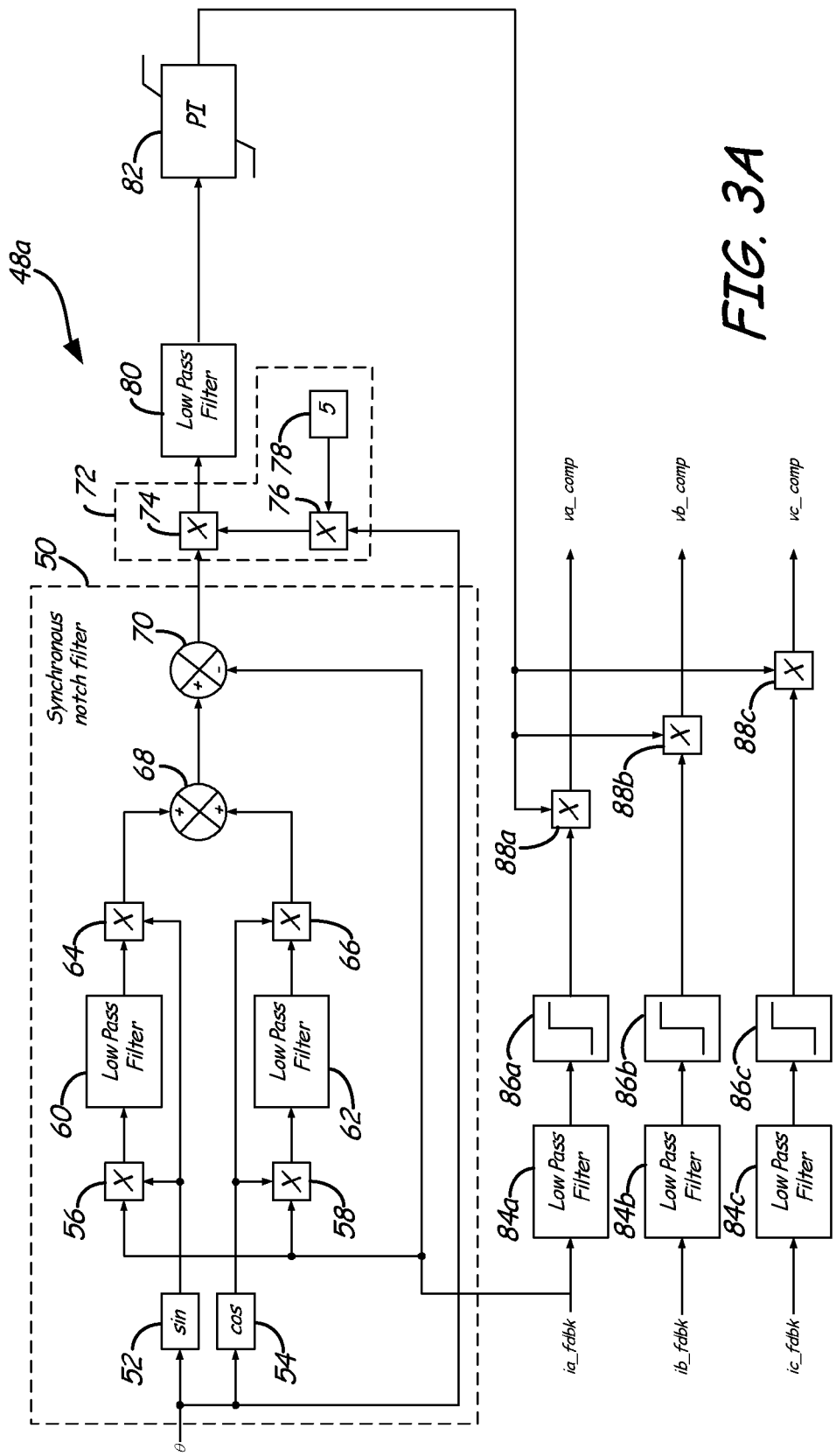
FIGS. 3A and 3B are block diagrams illustrating functions performed by a harmonic compensator employed in the PWM inverter controller according to embodiments of the present invention.

FIG. 3A is a block diagram illustrating functions performed by harmonic compensator 48 employed in PWM inverter controller 14 according to an embodiment of the present invention. Harmonic compensator 48 acts to isolate harmonics in the output current ia, ib, and ic supplied to PM motor 16. In general, harmonic compensator 48 transforms near sinusoidal phase currents into rectangular waveforms with distributed odd harmonics. The magnitude of the rectangular waveforms are adjusted based on harmonics detected in the monitored output current ia, ib, and ic. The resulting rectangular waveforms are the compensation signals va_comp, vb_comp, and vc_comp that are added to control signals va, vb, and vc (shown in FIG. 2) and provided to PWM signal generator 22.

In the embodiment shown in FIG. 3A, at least one phase of the monitored output current (e.g., monitored current phase ia_fdbk) is supplied to synchronous notch filter 50, which includes sine block 52, cosine block 54, multiplier blocks 56 and 58, low-pass filters 60 and 62, multiplier blocks 64 and 66, adder block 68, and difference block 70. The purpose of synchronous notch filter 50 is to remove the fundamental frequency from the monitored output current, leaving only the harmonics associated with the monitored phase current. Position information $\theta$ supplied by position sensor 18 is provided to sine block 52 and cosine block 54 to generate sinusoidal outputs corresponding with the fundamental frequency of the output current, without the presence of any harmonics. The monitored feedback output current (in this case, output current ia_fdbk) is multiplied with both the sine wave generated by sine block 52 and the cosine wave generated by cosine block 54 at multiplier blocks 56 and 58, respectively, to generate sine and cosine components of the monitored output current ia_fdbk. Low-pass filters 60 and 62 filter high-frequency harmonics from the respective sine and cosine components of the monitored output current ia_fdbk. The filtered outputs of low-pass filters 60 and 62 are multiplied with the sine wave generated by sine block 52 and cosine block 54 at multiplier blocks 64 and 66, respectively. The outputs of multiplier blocks 64 and 66 are combined at summer block 68, the output of which represents the fundamental frequency of the monitored current feedback without the presence of harmonics.

At block 70, the monitored phase current ia_fdbk is subtracted from the filtered fundamental frequency provided by block 68. The result of the subtraction is a notch-filter output that filters the fundamental frequency associated with the monitored phase current ia_fdbk, such that only the harmonics associated with the monitored phase current remain (i.e., notched output). In this way, synchronous notch filter 50 rejects the fundamental frequency associated with the monitored phase current ia_fdbk.

The output of synchronous notch filter 50 is applied to synchronous detector 72, which includes multiplier blocks 74 and 76 and harmonic integer value 78 isolates harmonics of a particular type within the output provided by synchronous notch filter 50. The harmonic isolated can be selected based on the value stored in memory by harmonic integer value 78. For example, in the embodiment shown in FIG. 3, the $5^{th}$ harmonic is selected for compensation. The harmonic integer value is multiplied with position sensor θ at multiplier block 76. The result is multiplied with the output of synchronous notch filter 50 by multiplier block 74.

The output of synchronous detector 72 is filtered by low-pass filter 80 to produce an error signal that is sensitive to the selected harmonic (e.g. $5^{th}$ harmonic). The error signal is provided to PI controller 82, which selects the magnitude of the compensation signal required to minimize the error signal provided to PI controller 82. That is, PI block 82 generates a compensation signal value that drives the error signal provided by low-pass filter 80 to zero.

The compensation signal generated by PI controller 82 is generated for summing with each voltage phase va, vb, and vc. With respect to each phase, the monitored phase currents ia_fdbk, ib_fdbk, and ic_fdbk are provided to low-pass filters 84a, 84b, and 84c, respectively, to isolate the fundamental frequency associated with each phase. The filtered outputs of low-pass filters 84a, 84b, and 84c are provided to zero-cross detectors 86a, 86b, and 86c, respectively, to convert the signals to respective square wave signals that correspond with the fundamental frequency of the monitored phase currents. The resulting square-wave signals are multiplied with the output of PI block 82 at multiplier blocks 88a, 88b, and 88c to generate compensation signals va_comp, vb_comp, and vc_comp.

Figure 3B:
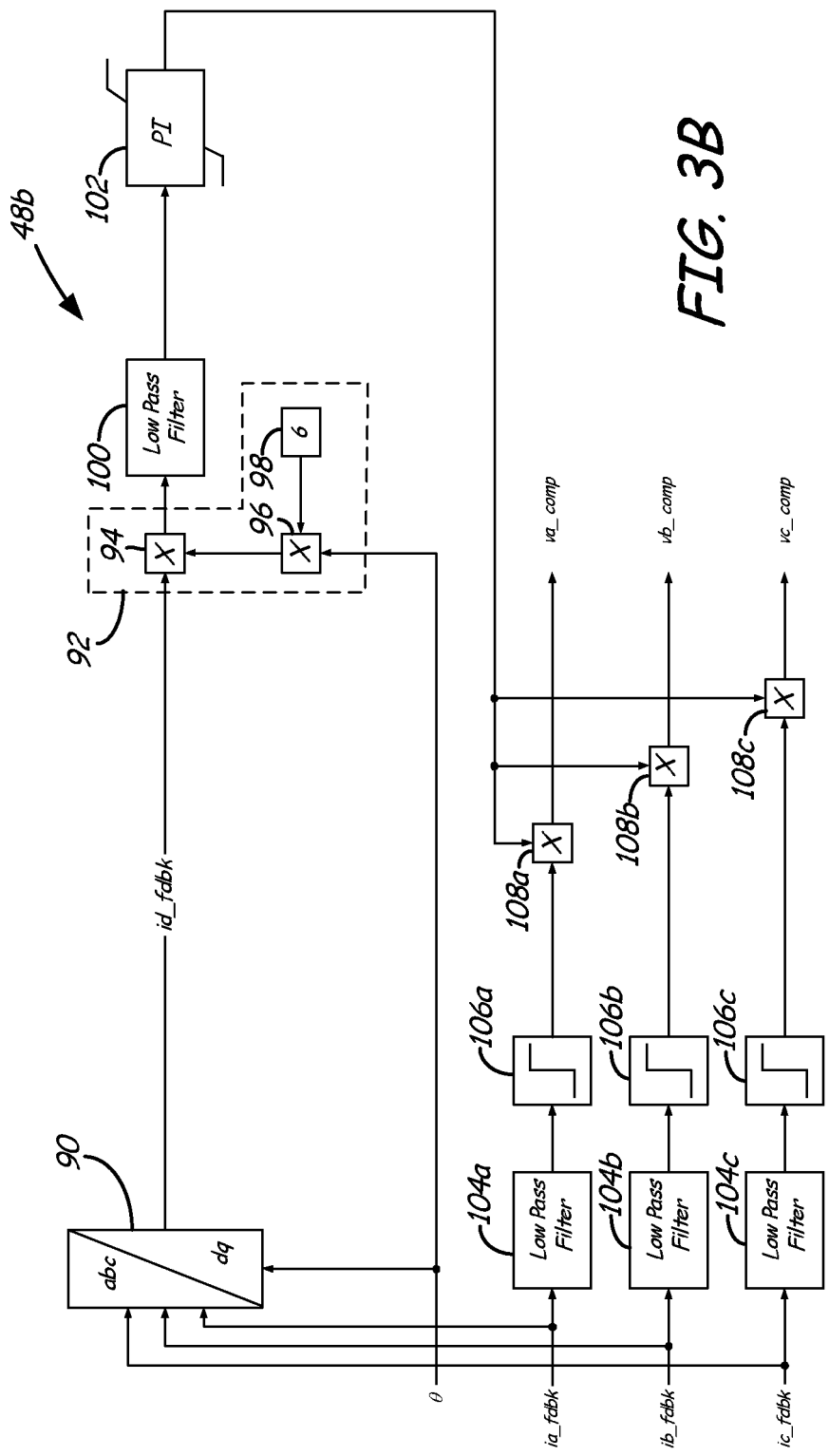

FIG. 3B is a block diagram illustrating functions performed by harmonic compensator 48 employed in PWM inverter controller 14 according to another embodiment of the present invention. The embodiment shown in FIG. 3B utilizes the direct current feedback component id_fdbk to provide the desired harmonic compensation, replacing the operations performed by synchronous notch filter 50 (shown in FIG. 3A) in isolating harmonics associated with the monitored current.

In the embodiment shown in FIG. 3B, abc/dq transform block 90 converts the monitored phase currents ia_fdbk, ib_fdbk, and ic_fdbk to a direct current feedback component id_fdbk. The direct current feedback component id_fdbk is provided to synchronous detector 92, which includes multiplier blocks 94 and 96 and harmonic integer value 98. In the embodiment shown in FIG. 3B, harmonic integer value 98 is set to six. Multiplier block 96 multiplies the integer value provided by integer block 98 with position information θ provided by position sensor 18 (shown in FIG. 1). Multiplier block 94 multiplies the output of multiplier block 96 (representing the $6^{th}$ harmonic) with the direct current feedback component id_fdbk to detect the $6^{th}$ harmonic component within the direct current feedback component id_fdbk. Low-pass filter 100 filters other components of direct current feedback component id_fdbk to provide the harmonic component of the direct current component id_fdbk to PI controller 102, which selects the magnitude of the compensation signal to drive the harmonic component to zero.

Once again, a compensation signal is generated for summing with each voltage phase va, vb, and vc. With respect to each phase, the monitored phase currents ia_fdbk, ib_fdbk, and ic_fdbk are provided to low-pass filters 104a, 104b, and 104c, respectively, to isolate the fundamental frequency associated with each phase. The filtered outputs of low-pass filters 104a, 104b, and 104c are provided to zero-cross detectors 106a, 106b, and 106c, to convert the signals to square wave signals that correspond with the fundamental frequency of the monitored phase currents. The resulting square-wave signals are multiplied with the output of PI block 102 at multiplier blocks 108a, 108b, and 108c to generate compensation signals va_comp, vb_comp, and vc_comp.

A benefit of the present invention described with respect to FIGS. 3A and 3B is that the magnitude of the compensation signal is derived in closed-loop fashion within several cycles of the fundamental frequency, which reduces sensitivity to time-variable inverter parameters and dc bus voltage ripple. That is, the compensation is based on the monitored phase current outputs, and is therefore auto-tuning (i.e., does not require information regarding characteristics of the PWM inverter itself).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pulse-width modulation (PWM) inverter controller for controlling operation of a PWM inverter connected to drive a permanent magnet (PM) motor, the PWM inverter controller comprising:
a field-oriented controller (FOC) that monitors output currents provided by the PWM inverter to the PM motor, the FOC employing the monitored output currents in a current loop feedback that generates control signals;
a harmonic compensator that transforms monitored phase currents into modified rectangular waveforms having magnitudes modified based on detected harmonics within the monitored phase currents to generate compensation signals, wherein the compensation signals generated by the harmonic compensator are summed with the control signals generated by the FOC to generate compensated control signals, and wherein the harmonic compensator comprises:
a synchronous notch filter that rejects a fundamental frequency associated with the monitored output currents;
a synchronous detector that isolates particular harmonics within an output of the synchronous notch filter;
a proportional-integral (PI) controller that generates an output based on a magnitude of the particular harmonics isolated by the synchronous detector;
a zero-cross detector that transforms the monitored phase currents into rectangular waveforms; and
a plurality of multipliers that multiply the rectangular waveforms with the output of the PI controller to generate modified rectangular waveforms having a magnitude modified based on detected harmonics within the monitored phase currents to generate the compensation signals; and
a PWM signal generator that generates PWM signals for controlling the PWM inverter based on the compensated control signals.

2. The PWM inverter controller of claim 1, wherein the particular harmonics isolated by the synchronous detector are stored in memory and can be modified to select a particular integer value harmonic.

3. The PWM inverter controller of claim 1, wherein the FOC converts the monitored output currents from an abc reference frame to a dq reference frame in which the monitored output currents are represented by a quadrature current feedback component and a direct current feedback component, and wherein the current loop feedback minimizes differences between a desired quadrature current component and the quadrature current feedback component and between a desired direct current component and the direct current feedback component.

4. A method of compensating for harmonics in output currents provided by a pulse-width modulation (PWM) inverter to a permanent magnet (PM) motor, the method comprising:
monitoring output currents provided by the PWM inverter to the PM motor;
applying the monitored output currents to a current loop feedback that generates control signals to minimize errors between the monitored output currents and desired output currents;
generating harmonic compensation signals by transforming monitored phase currents into modified rectangular waveforms having magnitudes modified based on detected harmonics within the monitored phase currents, wherein generating harmonic compensation signals includes:
applying the monitored output current to a synchronous notch filter that rejects a fundamental frequency associated with the monitored output current;
applying an output of the synchronous notch filter to a synchronous detector that isolates particular harmonics within an output of the synchronous notch filter;
applying the output of the synchronous notch filter to a proportional-integral (PI) controller that generates an output based on a magnitude of the particular harmonics isolated by the synchronous detector;
applying the monitored output current to a zero-cross detector that transforms the monitored phase currents into rectangular waveforms; and
multiplying the rectangular waveforms with the output of the PI controller to generate the harmonic compensation signals, wherein the harmonic compensation signals are the modified rectangular waveforms having a magnitude related to the output of the PI controller;
summing the harmonic compensation signals with the control signals to generate compensated control signals; and
generating PWM signals for controlling the PWM inverter based on the compensated control signals.

5. The method of claim 4, wherein applying the monitored currents to the current loop feedback includes:
converting the monitored currents from an abc reference frame to a dq reference frame in which the monitored output currents are represented as a quadrature current feedback component and a direct current feedback component;
comparing the quadrature current feedback component to a reference quadrature current component and the direct current feedback component to a reference direct current component; and
generating control signals to minimize the difference between the quadrature current feedback component and the reference quadrature current component and between the direct current feedback component and the reference direct current component.

6. A motor drive system comprising:
a pulse-width modulation (PWM) inverter having a plurality of solid-state switching devices selectively turned On/Off to convert a direct current (DC) input to an alternating current (AC) output for supply to a permanent magnet (PM) motor;
a PWM inverter controller that monitors output currents supplied by the PWM inverter to the PM motor and, in response, generates PWM signals provided to selectively control the solid-state switching devices within the PWM inverter, the PWM inverter controller comprising:
a field-oriented controller (FOC) that monitors the output currents provided by the PWM inverter to the PM motor, the FOC employing the monitored output currents in a current loop feedback that generates control signals;
a harmonic compensator that transforms monitored phase currents into modified rectangular waveforms having magnitudes modified based on detected harmonics within the monitored phase currents to generate compensation signals, wherein the compensation signals generated by the harmonic compensation block are summed with the control signals generated by the FOC to generate compensated control signals, and wherein the harmonic compensator comprises:
a synchronous notch filter that rejects a fundamental frequency associated with the monitored output currents;
a synchronous detector that isolates particular harmonics within an output of the synchronous notch filter;
a proportional-integral (PI) controller that generates an output based on the magnitude of the particular harmonics isolated by the synchronous detector;
a zero-cross detector that transforms the monitored phase currents into rectangular waveforms; and
a plurality of multipliers that multiply the rectangular waveforms with the output of the PI controller to generate the modified rectangular waveforms having a magnitude modified based on detected harmonics within the monitored phase currents to generate the compensation signals; and
a PWM signal generator that generates PWM signals for controlling the PWM inverter based on the compensated control signals.

7. The motor drive system of claim 6, wherein the particular harmonics isolated by the synchronous detector are stored in memory and can be modified to select a particular integer value harmonic.

8. The motor drive system of claim 6, wherein the FOC converts the monitored output currents from an abc reference frame to a dq reference frame in which the monitored output currents are represented by a quadrature current feedback component and a direct current feedback component, and wherein the current loop feedback minimizes differences between a desired quadrature current component and the quadrature current feedback component and between a desired direct current component and the direct current feedback component.

9. A pulse-width modulation (PWM) inverter controller for controlling operation of a PWM inverter connected to drive a permanent magnet (PM) motor, the PWM inverter controller comprising:
a field-oriented controller (FOC) that monitors output currents provided by the PWM inverter to the PM motor, the FOC employing the monitored output currents in a current loop feedback that generates control signals;
a harmonic compensator that transforms monitored phase currents into modified rectangular waveforms having magnitudes modified based on detected harmonics within the monitored phase currents to generate compensation signals, wherein the compensation signals generated by the harmonic compensator are summed with the control signals generated by the FOC to generate compensated control signals, and wherein the harmonic compensator comprises:

an abc/dq transformer that converts the monitored phase currents from an abc reference frame to a direct current feedback component that represents harmonic components in the monitored phase currents;

a synchronous detector that isolates particular harmonics within an output of the abc/dq transformer;

a proportional-integral (PI) controller that generates an output based on the magnitude of the particular harmonics isolated by the synchronous detector;

a zero-cross detector that transforms monitored phase currents into rectangular waveforms; and a plurality of multipliers that multiply the rectangular waveforms with the output of the PI controller to generate the modified rectangular waveforms having a magnitude modified based on detected harmonics within the monitored phase currents to generate the compensation signals; and a PWM signal generator that generates PWM signals for controlling the PWM inverter based on the compensated control signals.

10. The PWM inverter controller of claim 9, wherein the particular harmonics isolated by the synchronous detector are stored in memory and can be modified to select a particular integer value harmonic.

11. The PWM inverter controller of claim 9, wherein the FOC converts the monitored output currents from the abc reference frame to a dq reference frame in which the monitored output currents are represented by a quadrature current feedback component and a direct current feedback component, and wherein the current loop feedback minimizes differences between a desired quadrature current component and the quadrature current feedback component and between a desired direct current component and the direct current feedback component.

12. A method of compensating for harmonics in output currents provided by a pulse-width modulation (PWM) inverter to a permanent magnet (PM) motor, the method comprising:

monitoring output currents provided by the PWM inverter to the PM motor;

applying the monitored output currents to a current loop feedback that generates control signals to minimize errors between the monitored output currents and desired output currents;

generating harmonic compensation signals by transforming monitored phase currents into modified rectangular waveforms having magnitudes modified based on detected harmonics within the monitored phase currents, wherein generating harmonic compensation signals includes:

applying the monitored output current to an abc/dq transformer that converts the monitored phase currents to a direct current feedback component that represents harmonic components in the monitored phase currents;

applying the direct current feedback component to a synchronous detector that isolates particular harmonics within an output of a synchronous notch filter;

applying the output of the synchronous notch filter to a proportional-integral (PI) controller that generates an output based on the magnitude of the particular harmonics isolated by the synchronous detector;

applying the monitored output current to a zero-cross detector that transforms the monitored phase currents into rectangular waveforms; and multiplying the rectangular waveforms with the output of the PI controller to generate the harmonic compensation signals, wherein the harmonic compensation signals are the modified rectangular waveforms having a magnitude related to the output of the PI controller;

summing the harmonic compensation signals with the control signals to generate compensated control signals; and generating PWM signals for controlling the PWM inverter based on the compensated control signals.

13. The method of claim 12, wherein applying the monitored currents to the current loop feedback includes:

converting the monitored currents from the abc reference frame to a dq reference frame in which the monitored output currents are represented as a quadrature current feedback component and the direct current feedback component;

comparing the quadrature current feedback component to a reference quadrature current component and the direct current feedback component to a reference direct current component; and generating control signals to minimize the difference between the quadrature current feedback component and the reference quadrature current component and between the direct current feedback component and the reference direct current component.

14. A motor drive system comprising:

a pulse-width modulation (PWM) inverter having a plurality of solid-state switching devices selectively turned On/Off to convert a direct current (DC) input to an alternating current (AC) output for supply to a permanent magnet (PM) motor;

a PWM inverter controller that monitors output currents supplied by the PWM inverter to the PM motor and, in response, generates PWM signals provided to selectively control the solid-state switching devices within the PWM inverter, the PWM inverter controller comprising:

a field-oriented controller (FOC) that monitors the output currents provided by the PWM inverter to the PM motor, the FOC employing the monitored output currents in a current loop feedback that generates control signals;

a harmonic compensator that transforms monitored phase currents into modified rectangular waveforms having magnitudes modified based on detected harmonics within the monitored phase currents to generate compensation signals, wherein the compensation signals generated by the harmonic compensation block are summed with the control signals generated by the FOC to generate compensated control signals; and wherein the harmonic compensator comprises:

an abc/dq transformer that converts the monitored phase currents from an abc reference frame to a direct current feedback component that represents harmonic components in the monitored phase currents;

a synchronous detector that isolates particular harmonics within an output of the abc/dq transformer;

a proportional-integral (PI) controller that generates an output based on a magnitude of the particular harmonics isolated by the synchronous detector;

a zero-cross detector that transforms monitored phase currents into rectangular waveforms; and a plurality of multipliers that multiply the rectangular waveforms with the output of the PI controller to generate the modified rectangular waveforms having a magnitude modified based on detected harmonics within the monitored phase currents to generate the compensation signals, and a PWM signal generator that generates PWM signals for controlling the PWM inverter based on the compensated control signals.

15. The motor drive system of claim 14, wherein the particular harmonics isolated by the synchronous detector are stored in memory and can be modified to select a particular integer value harmonic.

16. The motor drive system of claim 14, wherein the FOC converts the monitored output currents from the abc reference frame to a dq reference frame in which the monitored output currents are represented by a quadrature current feedback component and the direct current feedback component, and wherein the current loop feedback minimizes differences between a desired quadrature current component and the quadrature current feedback component and between a desired direct current component and the direct current feedback component.

* * * * *